(12) United States Patent
Kobayashi et al.

(10) Patent No.: US 9,209,915 B2
(45) Date of Patent: Dec. 8, 2015

(54) CALIBRATION DEVICE AND CALIBRATION METHOD

(71) Applicant: Panasonic Intellectual Property Management Co., Ltd., Osaka (JP)

(72) Inventors: Masashi Kobayashi, Tokyo (JP); Koichiro Tanaka, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/666,617

(22) Filed: Mar. 24, 2015

(65) Prior Publication Data

US 2015/0295664 A1 Oct. 15, 2015

(30) Foreign Application Priority Data

Apr. 9, 2014 (JP) .................. 2014-080392

(51) Int. Cl.
*H04B 17/13* (2015.01)
*H04B 1/04* (2006.01)

(52) U.S. Cl.
CPC .............. *H04B 17/13* (2015.01); *H04B 1/0475* (2013.01)

(58) Field of Classification Search
CPC ........... H03F 1/0294; H03F 3/24; H03F 1/32; H03F 2200/336; H03F 1/3241; H03F 2200/375; H03C 5/00; H03D 7/165; H04B 17/13; H04B 1/0475
See application file for complete search history.

(56) References Cited

U.S. PATENT DOCUMENTS 6,032,028 A * 2/2000 Dickey et al. ............. 455/110
2006/0234661 A1* 10/2006 Toyota et al. ............ 455/252.1

FOREIGN PATENT DOCUMENTS

| JP | 8-213846 | 8/1996 |
| JP | 2012-085100 | 4/2012 |

* cited by examiner

*Primary Examiner* — Vineeta Panwalkar
(74) *Attorney, Agent, or Firm* — Seed IP Law Group PLLC (57) ABSTRACT

A calibration device includes a continuous wave signal generator that generates a continuous wave signal having a predetermined amplitude, a quadrature modulator that amplifies the continuous wave signal using a variable gain and performs quadrature modulation of the amplified continuous wave signal to generate a radio frequency signal, an envelope detector that detects an envelope of the radio frequency signal, a gain adjuster that adjusts the variable gain, based on power of the detected envelope, a correction value searcher that searches for a correction value that provides a minimum value of a fluctuation amount of an amplitude of the envelope, and a corrector that adds the correction value obtained through the search by the correction value searcher to the continuous wave signal and outputs the continuous wave signal after the addition to the quadrature modulator.

7 Claims, 9 Drawing Sheets

CALIBRATION DEVICE AND CALIBRATION METHOD

BACKGROUND

1. Technical Field

The present disclosure relates to a calibration device and a calibration method for correcting carrier leakage that occurs in a modulated transmission wave in a quadrature modulator.

2. Description of the Related Art

Recently, for wireless local area networks (LANs), the standardization of the Institute of Electrical and Electronics Engineering, Inc. (IEEE) 802.11ad communication specifications has been promoted. In IEEE 802.11ad, for example, phase modulation, quadrature amplitude modulation, or orthogonal frequency division multiplexing (OFDM) has been adopted as a modulation method for data transmission. When such a modulation method is used, to convert a baseband signal to a microwave or millimeter-wave modulated signal, a quadrature modulator is used.

To suppress an increase in circuit size, for example, it is desirable to perform quadrature modulation in a millimeter-wave frequency band. However, because a millimeter-wave is a radio frequency signal, crosstalk tends to occur in the inside of a circuit of a transmitting device (for example, a quadrature modulator), and carrier leakage tends to occur in the radio frequency signal after the quadrature modulation. Because carrier leakage is an unwanted component in reception by a receiving device, the detection accuracy for a received signal is degraded. Therefore, when the transmitting device generates a radio frequency signal, it is necessary to suppress (correct) carrier leakage that occurs in the radio frequency signal in the quadrature modulator.

Known techniques in the related art for correcting carrier leakage that occurs in a radio frequency signal in a quadrature modulator include, for example, techniques in Japanese Unexamined Patent Application Publication No. 8-213846 and Japanese Unexamined Patent Application Publication No. 2012-85100.

A transmitting device described in Japanese Unexamined Patent Application Publication No. 8-213846 supplies a signal to a quadrature modulator, and performs envelope detection of an output from the quadrature modulator, thereby obtaining an envelope amplitude. Then, the transmitting device inputs, to the quadrature modulator, a distortion correction signal by which a fluctuation amount of the envelope amplitude is made smaller, and corrects carrier leakage.

A wireless communication device described in Japanese Unexamined Patent Application Publication No. 2012-85100 has a setting table in which, for each value of transmission power of a modulated signal after quadrature modulation is performed, the transmission power value is associated with change amounts of direct current components of I and Q signals; for the change amounts, a carrier leakage amount included in the modulated signal having the transmission power becomes smaller than or equal to a predetermined value. By using the setting table, the wireless communication device adjusts, by change amounts corresponding to transmission power indicated by a power signal, direct current components of I and Q signals before quadrature modulation is performed.

SUMMARY

However, in the configuration in Japanese Unexamined Patent Application Publication No. 8-213846, when carrier leakage is corrected, correction of power of a transmission signal is not taken into consideration. Therefore, when a radio frequency signal (for example, a millimeter-wave) is used as a transmission signal, carrier leakage becomes larger and transmission power control is disturbed. Accordingly, it may be difficult to obtain desired power.

Although the setting table in Japanese Unexamined Patent Application Publication No. 2012-85100 is generated in advance, when a radio frequency signal (for example, a millimeter-wave) is used as a transmission signal, carrier leakage disturbs transmission power. Accordingly, the transmission power may be inaccurate upon the creation of the setting table.

One non-limiting and exemplary embodiment provides a calibration device and a calibration method that can suppress carrier leakage that occurs in quadrature modulation of a radio frequency signal and obtain a radio frequency signal having desired power, in order to solve the conventional problems described above.

In one general aspect, the techniques disclosed here feature a calibration device that includes a continuous wave signal generator that generates a continuous wave signal having a predetermined amplitude, a quadrature modulator that amplifies the continuous wave signal using a variable gain and performs quadrature modulation of the amplified continuous wave signal to generate a radio frequency signal, an envelope detector that detects an envelope of the radio frequency signal, a gain adjuster that adjusts the variable gain, based on power of the detected envelope, a correction value searcher that searches for a correction value that provides a minimum value of a fluctuation amount of an amplitude of the envelope, and a corrector that adds the correction value obtained through the search by the correction value searcher to the continuous wave signal and outputs the continuous wave signal after the addition to the quadrature modulator.

The present disclosure can suppress carrier leakage that occurs in quadrature modulation of a radio frequency signal and obtain a radio frequency signal having desired power.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 10A:
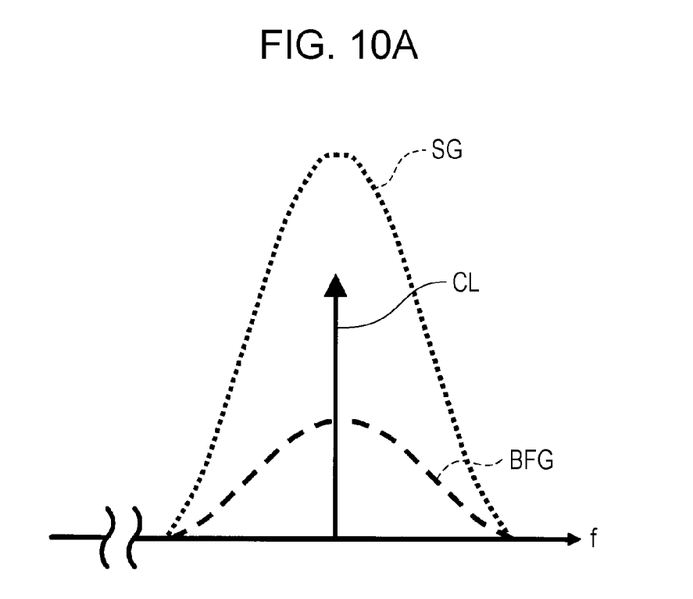
FIGS. 10A and 10B illustrate problems in the related art.
Figure 10B:
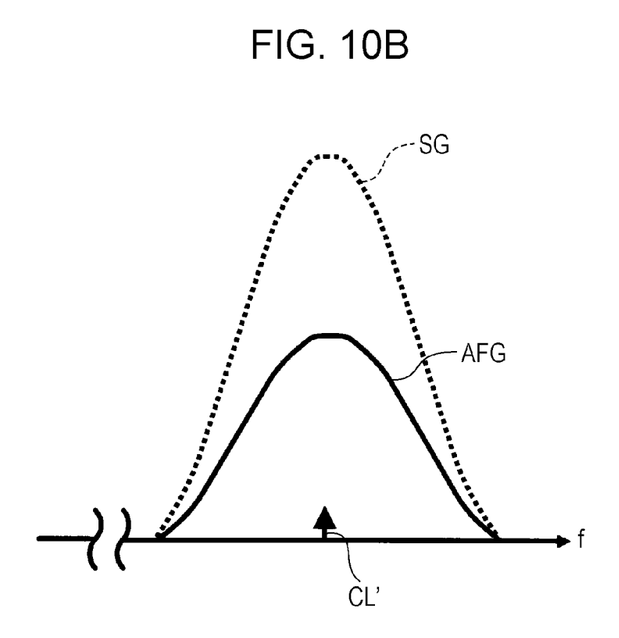

Underlying Knowledge Forming Basis of Embodiments of a Carrier Leakage Correction Device According to the Present Disclosure Before the description of details of an embodiment of a calibration device and a calibration method according to the present disclosure (referred to below as the "present embodiment"), underlying knowledge forming the basis of the details of the calibration device and the calibration method of the present embodiment will first be described with reference to FIGS. 10A and 10B. FIGS. 10A and 10B illustrate problems in the related art.

As described above, in Japanese Unexamined Patent Application Publication No. 8-213846, when carrier leakage is corrected, correction of power of a transmission signal is not taken into consideration. Therefore, if an attempt is made to correct carrier leakage and correct power of a transmission signal using the configuration in Japanese Unexamined Patent Application Publication No. 8-213846, the transmitting device in Japanese Unexamined Patent Application Publication No. 8-213846 controls transmission power in an amplifier disposed in a quadrature modulator, and then corrects the carrier leakage.

When a radio frequency signal (for example, a millimeter-wave) is used as a transmission signal, large carrier leakage occurs in the radio frequency signal. Accordingly, the carrier leakage may disturb power control for the radio frequency signal, and power after amplification may not be power that should be obtained, but be inaccurate.

For example, FIG. 10A illustrates carrier leakage CL before correction, a radio frequency signal BFG before power control, and a radio frequency signal SG having desired power that should be obtained. FIG. 10B illustrates carrier leakage CL' after the correction, a radio frequency signal AFG after the power control, and the radio frequency signal SG having the desired power that should be obtained. The large carrier leakage CL is suppressed to the small carrier leakage CL' through the correction.

However, even if the transmitting device in Japanese Unexamined Patent Application Publication No. 8-213846 attempts to control (for example, amplify) power of a radio frequency signal to desired power, when carrier leakage is large, power of the carrier leakage is added to the power of the radio frequency signal in power control, and the power after the power control is the power of the radio frequency signal AFG smaller than the radio frequency signal SG having the desired power that should be obtained (see FIG. 10B).

The wireless communication device described in Japanese Unexamined Patent Application Publication No. 2012-85100 controls power of a radio frequency signal (for example, a millimeter-wave) using a variable gain amplifier, in a radio frequency (RF) band subjected to quadrature modulation. Therefore, power consumption of the wireless communication device increases. To reduce the power consumption, it is considered that it is desirable to amplify power of a baseband signal in an amplifier disposed in a quadrature modulator. However, if a gain is changed in the amplifier in the quadrature modulator, carrier leakage occurs due to variations among differential signals input to the amplifier.

For this reason, also in Japanese Unexamined Patent Application Publication No. 2012-85100, as in Japanese Unexamined Patent Application Publication No. 8-213846, when a radio frequency signal (for example, a millimeter-wave) is used as a transmission signal, carrier leakage may cause the radio frequency signal power in the setting table to be inaccurate upon the generation of the setting table.

Therefore, in Japanese Unexamined Patent Application Publication No. 8-213846 and Japanese Unexamined Patent Application Publication No. 2012-85100, when a radio frequency signal (for example, a millimeter-wave) is used, carrier leakage fluctuates in response to manufacturing variations or an operating temperature range. Accordingly, there have been cases in which it has been difficult to transmit radio frequency signals normally.

In embodiments below, descriptions will thus be made of examples of a calibration device and a calibration method that can suppress carrier leakage that occurs in quadrature modulation of a radio frequency signal and obtain a radio frequency signal having desired power.

The calibration device and the calibration method of the present embodiment will now be described with reference to the drawings. The embodiments below are described with a transmitting device as an example of the calibration device according to the present disclosure. However, each embodiment may be represented as a calibration method that defines the operation of the transmitting device. In the embodiments below, the same components are given the same reference numerals, the descriptions of the same details are omitted or simplified, and different details are described.

Figure 1:
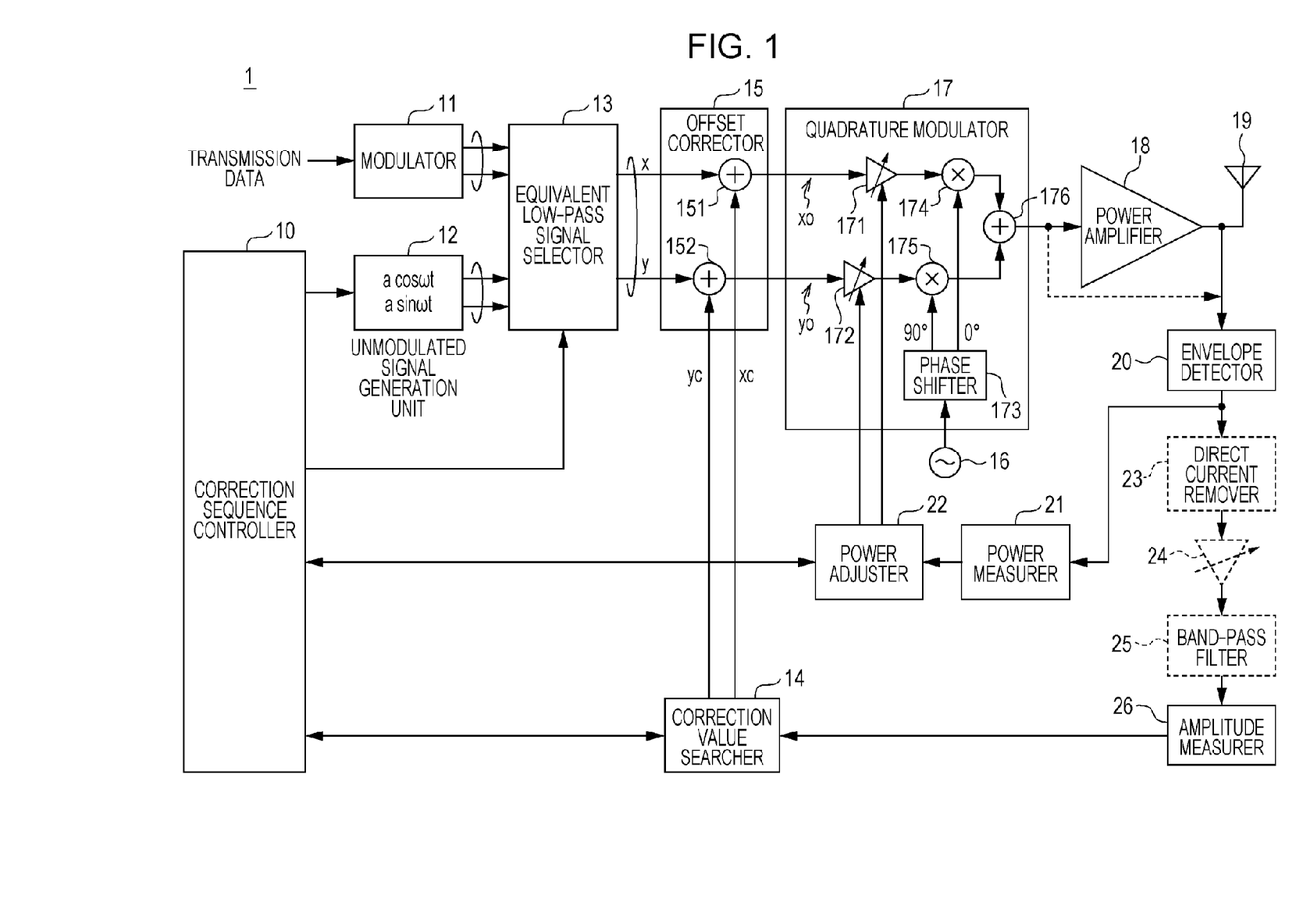
FIG. 1 is a circuit configuration diagram illustrating an internal configuration of a transmitting device of a present embodiment.

FIG. 1 is a circuit configuration diagram illustrating an internal configuration of a transmitting device 1 of the present embodiment. The transmitting device 1 illustrated in FIG. 1 includes a correction sequence controller 10, a modulator 11, a continuous wave signal generation unit 12, an equivalent low-pass signal selector 13, a correction value searcher 14, an offset corrector 15, a local oscillator 16, a quadrature modulator 17, a power amplifier 18 to which an antenna 19 is connected, an envelope detector 20, a power measurer 21, a power adjuster 22, and an amplitude measurer 26. The transmitting device 1 may further include a direct current blocker 23, a variable gain amplifier 24, and a band-pass filter 25.

The correction sequence controller 10 controls the operation of the continuous wave signal generation unit 12, the equivalent low-pass signal selector 13, the correction value searcher 14, and the power adjuster 22. For example, for correction of carrier leakage (referred to below simply as "carrier leakage correction") in the transmitting device 1, the correction sequence controller 10 outputs, to the continuous wave signal generation unit 12, a control signal for generating a continuous wave signal with a predetermined amplitude a (for example, a=1; the same applies below), outputs, to the equivalent low-pass signal selector 13, a control signal for selecting the continuous wave signal out of a modulated transmission signal and the continuous wave signal, outputs, to the power adjuster 22, a control signal for adjusting a gain used to amplify the continuous wave signal, and further outputs, to the correction value searcher 14, a control signal for outputting an offset correction value (xc,yc).

Moreover, for transmission of a modulated transmission signal, that is, transmission of regular transmission data (referred to below simply as "regular data transmission") in the transmitting device 1, the correction sequence controller 10 outputs, to the equivalent low-pass signal selector 13, a control signal for selecting the modulated transmission signal out of the modulated transmission signal and a continuous wave signal, outputs, to the power adjuster 22, a control signal for adjusting a gain used to amplify the modulated transmission signal, and further outputs, to the correction value searcher 14, a control signal for outputting an offset correction value (xc,yc) obtained through a search in carrier leakage correction.

The modulator 11 modulates transmission data using a predetermined modulation method (for example, binary phase shift keying (BPSK), quadrature phase shift keying (QPSK), or quadrature amplitude modulation (QAM)), and outputs a modulated transmission signal (equivalent low-pass signal) to the equivalent low-pass signal selector 13. The modulator 11 performs packetization by adding, for example, a preamble, header, and error correction code to the transmission data.

The continuous wave signal generation unit 12, which is an example of a continuous wave signal generator, generates a continuous wave signal (equivalent low-pass signal) that indicates a cosine wave and a sine wave, using the amplitude a specified by the control signal generated by the correction sequence controller 10. Then, the continuous wave signal generation unit 12 outputs the signal to the equivalent low-pass signal selector 13.

For regular data transmission, in response to the control signal generated by the correction sequence controller 10, the equivalent low-pass signal selector 13 selects the modulated transmission signal (equivalent low-pass signal) generated by the modulator 11. Then, the equivalent low-pass signal selector 13 outputs the signal to the offset corrector 15. Moreover, for carrier leakage correction, in response to the control signal generated by the correction sequence controller 10, the equivalent low-pass signal selector 13 selects the continuous wave signal (equivalent low-pass signal) generated by the continuous wave signal generation unit 12. Then, the equivalent low-pass signal selector 13 outputs the signal to the offset corrector 15.

In response to the control signal generated by the correction sequence controller 10, the correction value searcher 14 searches for an offset correction value that provides a minimum value of a fluctuation amount w (see the later description) of an amplitude of an envelope (referred to below simply as "envelope amplitude"), the fluctuation amount w being measured by the amplitude measurer 26. Then, the correction value searcher 14 outputs the offset correction value (xc,yc) obtained through the search to the offset corrector 15. xc indicates an in-phase component of the offset correction value, and yc indicates a quadrature component of the offset correction value.

Specifically, for regular data transmission, in response to the control signal generated by the correction sequence controller 10, the correction value searcher 14 outputs, to the offset corrector 15, the offset correction value, as a fixed value, obtained through the search in carrier leakage correction. Moreover, for carrier leakage correction, in response to the control signal generated by the correction sequence controller 10, the correction value searcher 14 outputs, to the offset corrector 15, an initial value of the offset correction value or the offset correction value obtained through a search by the correction value searcher 14.

The offset corrector 15, which is an example of a corrector, includes adders 151 and 152. The adder 151 adds an in-phase component of the signal selected by the equivalent low-pass signal selector 13 and the in-phase component xc of the offset correction value output by the correction value searcher 14, and outputs a resultant in-phase component to the quadrature modulator 17. The adder 152 adds a quadrature component of the signal selected by the equivalent low-pass signal selector 13 and the quadrature component yc of the offset correction value output by the correction value searcher 14, and outputs a resultant quadrature component to the quadrature modulator 17.

The local oscillator 16 generates, for example, a carrier signal of a microwave band or millimeter-wave band, and outputs the signal to a phase shifter 173 of the quadrature modulator 17.

The quadrature modulator 17 includes variable gain amplifiers 171 and 172, the phase shifter 173, multipliers 174 and 175, and an adder 176. The quadrature modulator 17 amplifies the equivalent low-pass signal (modulated transmission signal or continuous wave signal) output by the offset corrector 15, using a variable gain adjusted by the power adjuster 22. Moreover, the quadrature modulator 17 performs quadrature modulation using the equivalent low-pass signal (modulated transmission signal or continuous wave signal) after the amplification and the carrier signal output by the local oscillator 16, and converts the carrier signal to a radio frequency signal. The quadrature modulator 17 outputs the radio frequency signal to the power amplifier 18.

In the quadrature modulator 17, an offset xo indicating carrier leakage is added to the in-phase component of the equivalent low-pass signal output by the offset corrector 15. Similarly, an offset yo indicating carrier leakage is added to the quadrature component of the equivalent low-pass signal output by the offset corrector 15 (see FIG. 1).

Using a gain Av adjusted by the power adjuster 22, the variable gain amplifier 171 amplifies a signal (x+xo), in which the offset xo is added to an in-phase component x of the equivalent low-pass signal output by the offset corrector 15. The gain Av is, for example, an initial value of a gain for the variable gain amplifier 171.

Using the gain Av adjusted by the power adjuster 22, the variable gain amplifier 172 amplifies a signal (y+yo), in which the offset yo is added to a quadrature component y of the equivalent low-pass signal output by the offset corrector 15. The gain Av is, for example, an initial value of a gain for the variable gain amplifier 172.

The phase shifter 173 generates an in-phase (0°) carrier signal and a quadrature (90°) carrier signal for the carrier signal generated by the local oscillator 16. The phase shifter 173 outputs the in-phase carrier signal to the multiplier 174, and outputs the quadrature carrier signal to the multiplier 175.

The multiplier 174 multiplies the output signal (in-phase component) from the variable gain amplifier 171 and the in-phase (0°) carrier signal together, and outputs an in-phase component of the radio frequency signal to the adder 176. The multiplier 175 multiplies the output signal (quadrature component) from the variable gain amplifier 172 and the quadrature (90°) carrier signal together, and outputs a quadrature component of the radio frequency signal to the adder 176. The adder 176 adds the output from the multiplier 174 and the output from the multiplier 175 to generate a radio frequency signal, and outputs the radio frequency signal to the power amplifier 18.

In the above description, the multipliers 174 and 175 of the quadrature modulator 17 modulate local signals of the same frequency as the carrier frequency used for regular data transmission. However, for example, local signals of a frequency different from the carrier frequency used for regular data transmission may be modulated, and a separately disposed frequency convertor may perform frequency conversion of the output from the quadrature modulator 17 to the carrier frequency used for regular data transmission.

The power amplifier 18 amplifies power of the radio frequency signal output by the quadrature modulator 17, and supplies the signal to the antenna 19. The antenna 19 emits the radio frequency signal amplified by the power amplifier 18.

The envelope detector 20 receives an input of part of the radio frequency signal output by the power amplifier 18, or the radio frequency signal output by the quadrature modulator 17. Although not illustrated, the power amplifier 18 may have, for example, a multistage configuration, and part of a signal in an intermediate stage of the power amplifier 18 may be input to the envelope detector 20.

The envelope detector 20 detects an envelope of the radio frequency signal output by the power amplifier 18, detects an envelope amplitude as an envelope detection output, and outputs the envelope amplitude to the power measurer 21 and the amplitude measurer 26. One or two or more of the direct current blocker 23, the variable gain amplifier 24, and the band-pass filter 25 may be disposed between the envelope detector 20 and the amplitude measurer 26 (see the units denoted by dotted lines).

To control the power of the radio frequency signal to desired power (see the line denoted by the symbol SG in FIG. 10A), the power measurer 21 measures power (output power P) of a signal with the envelope amplitude output by the envelope detector 20, and outputs the power to the power adjuster 22.

Figure 2:
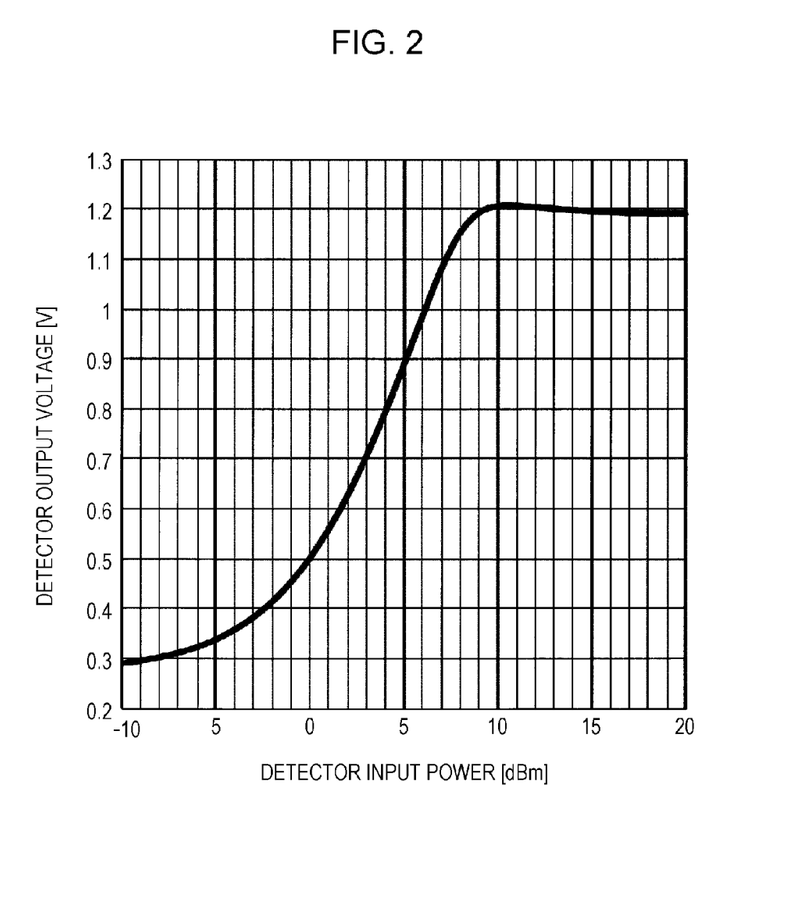
FIG. 2 illustrates an example of an input-output characteristic of an envelope detector.

In response to the control signal generated by the correction sequence controller 10, the power adjuster 22, which is an example of a gain adjuster, adjusts the gain Av for the variable gain amplifiers 171 and 172 such that the output power P from the power measurer 21 falls within a power range that can be correctly detected by the envelope detector 20 (see FIG. 2). A gain obtained after n-th adjustment in the power adjuster 22 will be referred to below as Avn. n is an integer of 1 or larger.

The amplitude measurer 26 measures a temporal fluctuation amount w of the envelope amplitude output by one of the envelope detector 20, the direct current blocker 23, the variable gain amplifier 24, and the band-pass filter 25, and outputs the temporal fluctuation amount w to the correction value searcher 14. The direct current blocker 23 removes a direct current component of the envelope amplitude that occurs due to carrier leakage. The variable gain amplifier 24 amplifies the fluctuation amount w of the envelope amplitude that occurs due to carrier leakage. The band-pass filter 25, which is an example of a signal extractor, extracts a frequency component of the fluctuation amount w of the envelope amplitude that occurs due to carrier leakage, and removes an unwanted component that is a component other than the frequency component of the fluctuation amount w of the envelope amplitude.

Thus, the amplitude measurer 26 receives an input of the envelope amplitude detected by the envelope detector 20, of which the unnecessary component is removed, the fluctuation amount w of the envelope amplitude is amplified, and the frequency component of the fluctuation amount w of the envelope amplitude is extracted. Therefore, the amplitude measurer 26 can measure the fluctuation amount w of an envelope amplitude v with high accuracy. The band-pass filter 25 may be configured with, for example, a filter with analog devices, finite impulse response (FIR) filter, infinite impulse response (IIR) filter, or fast Fourier transform (FFT).

FIG. 2 illustrates an example of an input-output characteristic of the envelope detector 20. The horizontal axis in FIG. 2 represents the input power [dBm] of the envelope detector 20, and the vertical axis in FIG. 2 represents the output voltage [V] of the envelope detector 20. In FIG. 2, a power range that can be correctly detected by the envelope detector 20 is about 0 to 7 [dBm]. To correct carrier leakage, the envelope detector 20 detects the envelope correctly. Therefore, the transmitting device 1 controls power of a continuous wave signal to be subjected to quadrature modulation, that is, adjusts a gain for the variable gain amplifiers 171 and 172 such that the envelope detector 20 can correctly detect power of a radio frequency signal.

The operation of first power control for a radio frequency signal in the transmitting device 1 of the present embodiment will now be described in more detail.

The continuous wave signal generation unit 12 generates a cosine wave signal x expressed by the formula (1) and a sine wave signal y expressed by the formula (2), and outputs the signals to the equivalent low-pass signal selector 13. In the formulae (1) and (2), a indicates an amplitude of a continuous wave signal, ω indicates an angular frequency, and t indicates a time point. It is preferable that ω is selected within a frequency range for a modulated transmission signal.

Figure 4:
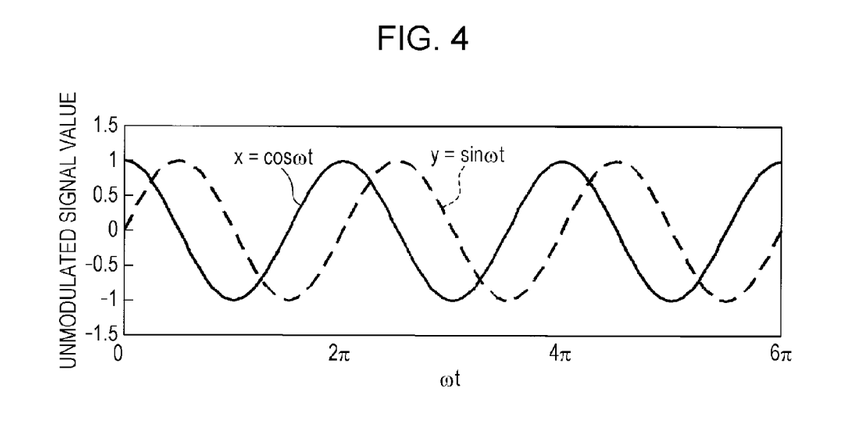
FIG. 4 illustrates an example of a continuous wave signal when a continuous wave signal amplitude a=1.

For example, in IEEE 802.11ad, because a frequency range is approximately a millimeter-wave center frequency ±1 GHz, 110 MHz×2π and 220 MHz×2π are set such that a frequency is smaller than or equal to 1 GHz. FIG. 4 illustrates an example of a continuous wave signal when a continuous wave signal amplitude a=1.

$$x = a \cos \omega t \tag{1}$$

$$y = a \sin \omega t \tag{2}$$

The offset corrector 15 adds the in-phase component xc of an offset correction value to the cosine wave signal x expressed by the formula (1) and adds the quadrature component yc of the offset correction value to the sine wave signal y expressed by the formula (2), thereby outputting continuous wave signals x1 and y1 expressed by the formulae (3) and (4) to the quadrature modulator 17. Because an appropriate offset amount is unknown upon the start of radio frequency signal control, the offset corrector 15 adds, for example, a predetermined initial value. The initial value of the correction value (xc,yc) for the offset corrector 15 is (0,0), but the initial value is not limited to (0,0).

$$x1 = xc + a \cos \omega t \tag{3}$$

$$y1 = yc + a \sin \omega t \tag{4}$$

The quadrature modulator 17 performs quadrature modulation of carrier signals using the continuous wave signals x1 and y1, but quadrature modulation is affected by offsets xo and yo indicating carrier leakage. That is, in quadrature modulation, the offset xo indicating carrier leakage is added to the continuous wave signal x1, and the offset yo indicating carrier leakage is added to the continuous wave signal y1. When the initial value of the offset correction value (xc,yc) is (0,0), a radio frequency signal s in a millimeter-wave band, which is an output from the quadrature modulator 17, is expressed by the formula (5). In the formula (5), Av is an initial value of a gain for the variable gain amplifiers 171 and 172, and j is an imaginary unit.

$$s = Av(xo + a \cos \omega t) + j(Av(yo + a \sin \omega t)) \tag{5}$$

The envelope detector 20 outputs, for example, a value proportional to the envelope amplitude v or a value proportional to a square value of the envelope amplitude v as a value based on the envelope amplitude v of the radio frequency signal s expressed by the formula (5). The envelope amplitude v is expressed by the formula (6).

$$v = \{(Av \times a)^2 + r^2 + 2Av \times ar \cos(\omega t - \theta)\}^{1/2} \quad (6)$$

In the formula (6), r and θ indicate a radius and an angle when orthogonal coordinates (xo,yo) are expressed in polar coordinates. An error r is expressed by the formula (7).

$$r = \{(Av \times xo)^2 + (Av \times yo)^2\}^{1/2} \quad (7)$$

Figure 5A:
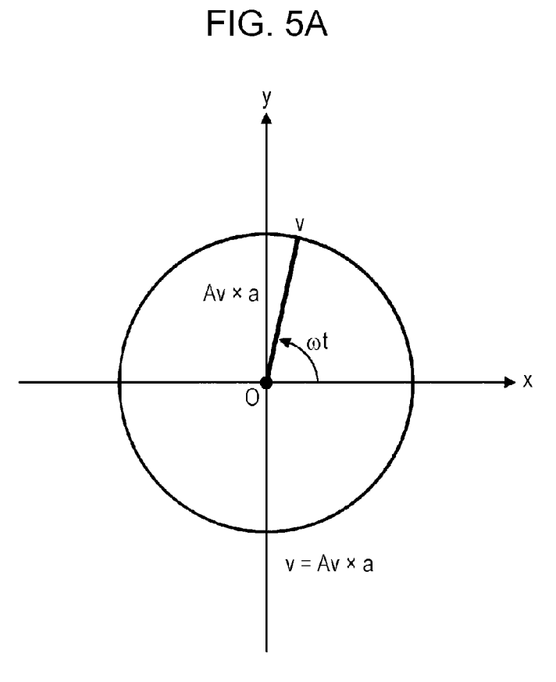
FIG. 5A illustrates an envelope amplitude v without carrier leakage.
Figure 5B:
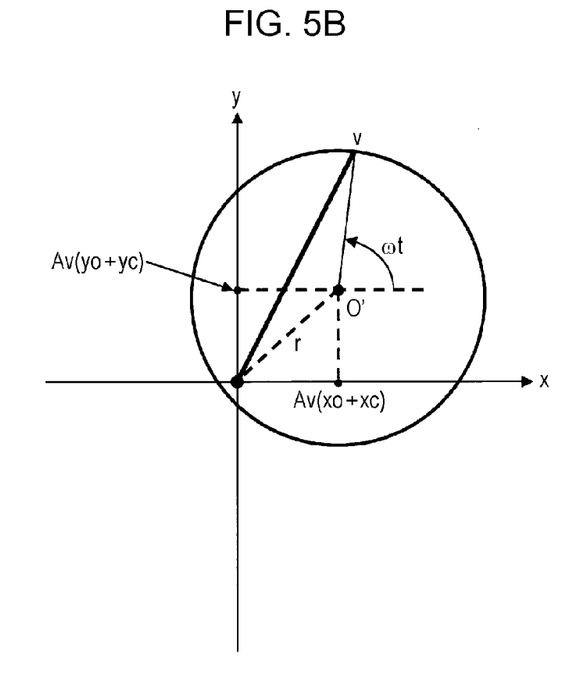
FIG. 5B illustrates the envelope amplitude v with carrier leakage.

The envelope amplitude will be described here with reference to FIGS. 4, 5A, and 5B. FIG. 5A illustrates the envelope amplitude v without carrier leakage. FIG. 5B illustrates the envelope amplitude v with carrier leakage. The envelope amplitude v indicates a distance from the origin of the orthogonal coordinate system illustrated in FIG. 5A or 5B, that is, the origin of an equivalent low-pass signal to a position on a circle illustrated in FIG. 5A or 5B.

When there is no carrier leakage, because the cosine wave signal x and the sine wave signal y illustrated in FIG. 4 appear on the horizontal and vertical axes of the orthogonal coordinate system, the equivalent low-pass signal is represented as a circle around an origin O illustrated in FIG. 5A. Accordingly, the envelope amplitude v is constant (v=Av×a).

On the other hand, when there is carrier leakage, the equivalent low-pass signal is expressed as a circle around coordinates O' (Av(xo+xc), Av(yo+yc)) of the orthogonal coordinate system illustrated in FIG. 5B. That is, when there is carrier leakage, the center point O' of the circle indicating the equivalent low-pass signal deviates from the origin O of the orthogonal coordinate system in response to the error r. Accordingly, the envelope amplitude v changes periodically as the time point t, that is, a phase cot proceeds. In the formula (6), a term in which temporal fluctuations of the envelope amplitude v occur is a component of 2Av×ar cos(ωt−θ).

The power measurer 21 measures power of a signal with the envelope detected by the envelope detector 20. For example, when the envelope detector 20 outputs a square of the envelope amplitude, the output power P from the power measurer 21 is expressed by the formula (8).

$$P = ((Av \times a) + r)^2 + |(Av \times a) - r|^2)/2 = (Av \times a)^2 + r^2 \quad (8)$$

Figure 6A:
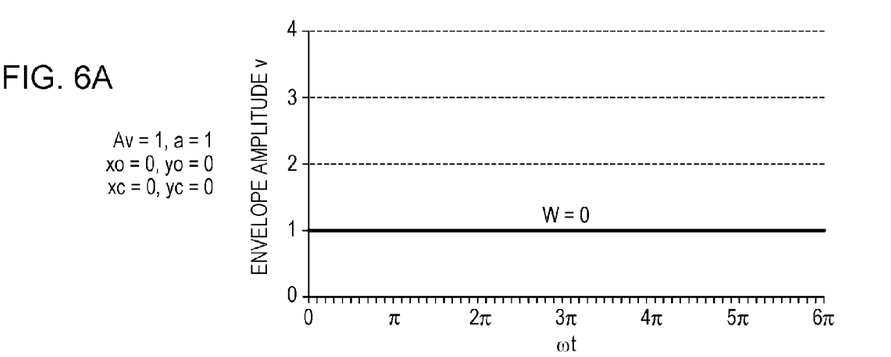
FIG. 6A illustrates an example of temporal changes in the envelope amplitude v and the fluctuation amount w without carrier leakage.
Figure 6B:
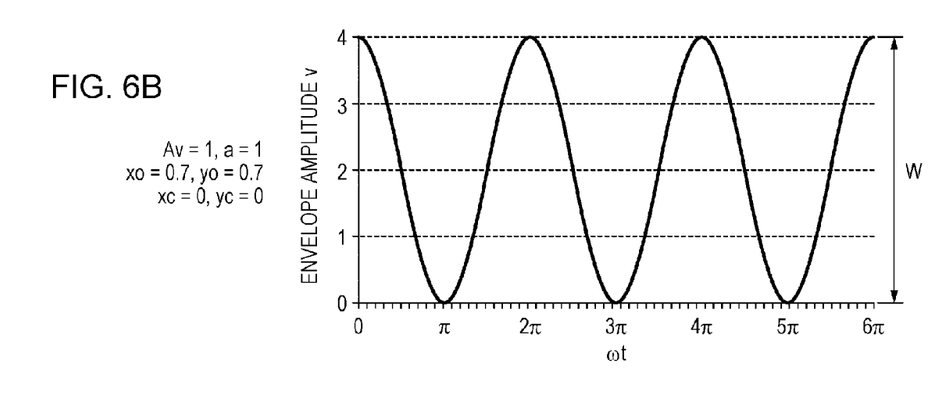
FIG. 6B illustrates an example of temporal changes in the envelope amplitude v and the fluctuation amount w with carrier leakage.

FIG. 6A illustrates an example of temporal changes in the envelope amplitude v and the fluctuation amount w without carrier leakage. FIG. 6B illustrates an example of temporal changes in the envelope amplitude v and the fluctuation amount w with carrier leakage. In the formula (8), because the temporal fluctuation term of 2Av×ar cos(ωt−θ) is not taken into consideration in the power measurer 21, the power is indicated as an average value (center value). In FIGS. 6A and 6B, the output power P is as follows depending on whether or not there is carrier leakage. In FIGS. 6A and 6B, to describe a difference in the output power P depending on whether or not there is carrier leakage, Av×a=1×1=1 regardless of whether or not there is carrier leakage.

Specifically, in FIG. 6A without carrier leakage, the output power P from the power measurer 21 is 1.0. In FIG. 6B with carrier leakage, the output power P from the power measurer 21 is about 2.0. Therefore, in a comparison between FIGS. 6A and 6B, the same amplitude a and gain Av are indicated, but a difference in power is about twice, that is, about 3 dB due to an impact of carrier leakage in the formula (8) (specifically, a square component of the error r ($r^2$)).

The power adjuster 22 adjusts the gain Av for the variable gain amplifiers 171 and 172 such that the output power P from the power measurer 21 falls within a power range that can be detected by the envelope detector 20. However, because the $r^2$ components in the formula (8), that is, xo and yo indicating carrier leakage are large in the radio frequency signal (for example, a millimeter-wave), power control is disturbed and the power of the radio frequency signal is inaccurate as illustrated in FIG. 5B. Therefore, the correction sequence controller 10 provides an instruction for carrier leakage correction after the power control for the radio frequency signal.

When the initial value of the offset correction value (xc,yc) is used and the power of the radio frequency signal including the power of carrier leakage falls within the power range that can be detected by the envelope detector 20, the transmitting device 1 may omit the power control for the radio frequency signal. This enables the transmitting device 1 to reduce the number of times the power control for the radio frequency signal is performed and simplify the operation required for carrier leakage correction.

The operation of first carrier leakage correction in the transmitting device 1 of the present embodiment will next be described in more detail.

The continuous wave signal generation unit 12 generates the cosine wave signal x expressed by the formula (1) and the sine wave signal y expressed by the formula (2), and outputs the signals to the equivalent low-pass signal selector 13.

The offset corrector 15 adds the in-phase component xc of the offset correction value to the cosine wave signal x expressed by the formula (1) and adds the quadrature component yc of the offset correction value to the sine wave signal y expressed by the formula (2), thereby outputting the continuous wave signals x1 and y1 expressed by the formulae (3) and (4) to the quadrature modulator 17.

The quadrature modulator 17 performs quadrature modulation of carrier signals using the continuous wave signals x1 and y1, but quadrature modulation is affected by offsets xo(Av1) and yo(Av1) indicating carrier leakage. For the gain of Av1, xo(Av1) and yo(Av1) indicate carrier leakage that occurs in the variable gain amplifier 171 and 172.

That is, in the quadrature modulator 17, the offset xo(Av1) indicating carrier leakage is added to the continuous wave signal x1, and the offset yo(Av1) indicating carrier leakage is added to the continuous wave signal y1. The radio frequency signal s in a millimeter-wave band, which is an output from the quadrature modulator 17, is expressed by the formula (9). j is an imaginary unit.

$$s = Av1(xo(Av1) + xc + a \cos \omega t) + j\{Av1(yo(Av1) + yc + a \sin \omega t)\} \quad (9)$$

An object of carrier leakage correction in the transmitting device 1 of the present embodiment is to obtain the in-phase component xc (=−xo) and the quadrature component yc (=−yo) of the offset correction value as a correction coefficient for canceling the offsets xo and yo, which are difficult to measure.

The envelope detector 20 outputs, for example, a value proportional to the envelope amplitude v or a value proportional to a square value of the envelope amplitude v as a value based on the envelope amplitude v of the radio frequency signal s expressed by the formula (9). The envelope amplitude v is expressed by the formula (10).

$$v = \{(Av1 \times a)^2 + r^2 + 2Av1 \times ar \cos(\omega t \theta)\}^{1/2} \quad (10)$$

In the formula (10), r and θ indicate an error which is a deviation from the origin O of the orthogonal coordinate system and an angle when orthogonal coordinates (xo(Av1)+ xc,yo(Av1)+yc) are expressed in polar coordinates. The error r is expressed by the formula (11).

$$r=\{(Av1(xo(Av1)+xc))^2+(Av1(yo(Av1)+yc))^2\}^{1/2} \quad (11)$$

For carrier leakage correction, the disappearance of temporal fluctuations of the envelope amplitude v through a search for values of the in-phase component xc and the quadrature component yc of the offset correction value means that the error r=0 expressed by the formula (11). In the formula (11), the in-phase component xc1 and the quadrature component yc1 of the offset correction value for the error r=0 mean that (xo(Av1)+xc1,yo(Av1)+yc1)=(0,0), indicating that xc1=−xo(Av1) and yc1=−yo(Av1) can be achieved.

Also in FIG. 5A, the disappearance of the fluctuation amount w of the envelope amplitude v means that the center of the circle indicating the equivalent low-pass signal (see FIG. 5A or 5B) is the origin of the orthogonal coordinate system, that is, (xo(Av1)+xc1,yo(Av1)+yc1)=(0,0).

The amplitude measurer 26 measures the temporal fluctuation amount w of the envelope amplitude detected by the envelope detector 20. For example, when the envelope detector 20 outputs the n-th power of the envelope amplitude v and the amplitude measurer 26 measures a difference between the maximum value and the minimum value (peak to peak), the amplitude measurer 26 outputs the fluctuation amount w expressed by the formula (12), where n is a real number.

$$w=(a+r)^n-|a-r|^n \quad (12)$$

In FIG. 6A or 6B, if the integer n in the formula (12) is 2 for simplicity of the description, when there is no carrier leakage, the envelope amplitude v is a constant value and therefore the fluctuation amount w=0 (see FIG. 6A). On the other hand, when there is carrier leakage, the envelope amplitude v fluctuates periodically (see FIG. 6B). The fluctuation period of the envelope amplitude v is the same as the period of the continuous wave signal illustrated in FIG. 4, and the fluctuation amount w illustrated in FIG. 6B is about 4.0.

The amplitude a of the continuous wave signal in the formula (12) is a constant determined by the correction sequence controller 10, the error r is expressed by the formula (11), and xo(Av1) and yo(Av1) in the formula (11) are constants (unknowns, however). Therefore, the fluctuation amount w of the envelope amplitude v expressed by the formula (12) is a function of xc and yc (see the formula (13)).

$$w=f(xc,yc) \quad (13)$$

The correction value searcher 14 sets the in-phase component xc and the quadrature component yc of the offset correction value such that the fluctuation amount w expressed by the formula (13) becomes the minimum value, ideally zero. Specifically, the correction value searcher 14 starts with the initial value of the offset correction value (xc,yc)=(0,0), changes the offset correction value (xc,yc) gradually such that the fluctuation amount w is made smaller, and causes the fluctuation amount w to converge on the minimum value, thereby completing a search for the offset correction value (xc,yc).

The initial value of the offset correction value (xc,yc) may be any value other than (0,0). The correction value searcher 14 may use a plurality of types of initial values, cause the fluctuation amount w to converge on the minimum value as a result of a search, and select the offset correction value obtained through the search as an initial value.

A method for making a search for the offset correction value (xc,yc) in the correction value searcher 14 is, for example, the following.

Specifically, assuming that the current value of the offset correction value (xc,yc) is $(x_{now},y_{now})$ and α is a minute constant as compared with $x_{now}$ and $y_{now}$, the correction value searcher 14 changes (xc,yc) to four different values $(x_{now}+\alpha, y_{now})$, $(x_{now}-\alpha,y_{now})$, $(x_{now},y_{now}+\alpha)$, and $(x_{now},y_{now}-\alpha)$ and measures the fluctuation amount w. The correction value searcher 14 selects, as a new current value, the offset correction value (xc,yc) that provides the minimum value of the fluctuation amount w.

The correction value searcher 14 repeats the operation of changing the offset correction value to the four different values using the constant α. When the fluctuation amount w for the offset correction value (xc,yc)=$(x_{now},y_{now})$ causes the offset correction value (xc,yc) to change to the four different values and the fluctuation amount w converges on the minimum value, the correction value searcher 14 completes a search with the offset correction value (xc1,yc1).

Another method for making a search for the offset correction value (xc,yc) is the following.

Specifically, the correction value searcher 14 changes the offset correction value (xc,yc) to two different values $(x_{now}+\alpha,y_{now})$ and $(x_{now}-\alpha,y_{now})$ using the minute constant α as above, and measures the fluctuation amount w. The correction value searcher 14 selects, as a new current value, the offset correction value (xc,yc) that provides the minimum value of the fluctuation amount w.

The correction value searcher 14 repeats the operation of changing the offset correction value to the two different values in the x direction using the constant α. When the fluctuation amount w for the offset correction value (xc,yc)=$(x_{now}, y_{now})$ causes the offset correction value (xc,yc) to change to the two different values and the fluctuation amount w converges on the minimum value, the correction value searcher 14 completes a search with the in-phase component xc1 of the offset correction value in the x direction.

Next, the correction value searcher 14 changes the offset correction value (xc,yc) to two different values $(x_{now},y_{now}+\alpha)$ and $(x_{now},y_{now}-\alpha)$, and measures the fluctuation amount w. The correction value searcher 14 selects, as a new current value, the offset correction value (xc,yc) that provides the minimum value of the fluctuation amount w.

The correction value searcher 14 repeats the operation of changing the offset correction value to the two different values in the y direction using the constant α. When the fluctuation amount w for the offset correction value (xc,yc)=$(x_{now}, y_{now})$ causes the offset correction value (xc,yc) to change to the two different values and the fluctuation amount w converges on the minimum value, the correction value searcher 14 completes a search with the quadrature component yc1 of the offset correction value in the y direction.

The correction value searcher 14 may complete a search when one search for the in-phase component xc of the offset correction value in the x direction and one search for the quadrature component yc of the offset correction value in the y direction are made, or may further repeat similar processing a plurality of times. The offset correction value (xc1,yc1) that minimizes the fluctuation amount w is thus obtained.

Figure 3:
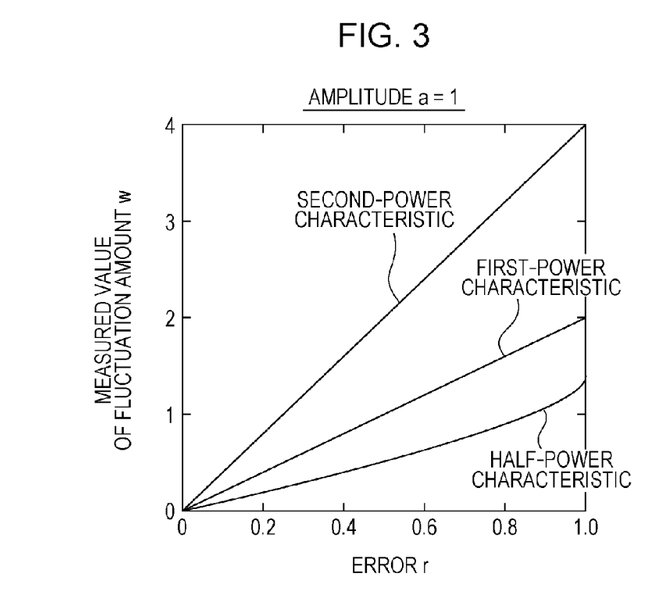
FIG. 3 illustrates an example of a relationship between an error r and a measured value of a fluctuation amount w for each detection characteristic of the envelope detector when a continuous wave signal amplitude a=1.

FIG. 3 illustrates an example of a relationship between the error r and a measured value of the fluctuation amount w for each detection characteristic of the envelope detector when the continuous wave signal amplitude a=1. That is, FIG. 3 illustrates a relationship between the error r expressed by the formula (11) and the measured value of the fluctuation amount w of the envelope amplitude v measured by the amplitude measurer 26.

As the detection characteristics of the envelope detector 20, FIG. 3 illustrates, for example, a second-power characteristic, a first-power characteristic, and a half-power characteristic. For example, when an amplitude of a relatively small signal is detected using the non-linearity of a circuit, the second-power characteristic is often used, and when a rectifier for switching between the on operation and the off operation is used, the first-power characteristic is often used. Because the output voltage is constrained by the power supply voltage regardless of the circuit type, an output is saturated when an input is large. The half-power characteristic is indicated as an example for representing saturation. The amplitude measurer 26 measures and outputs a difference between the maximum value and the minimum value (peak to peak) of the fluctuation amount w of the envelope amplitude v.

In FIG. 3, the continuous wave signal amplitude a is 1, and the error r expressed by the formula (7) is in a range of 0 to 1. In FIG. 3, the fluctuation amount w increases or decreases monotonically in response to an increase or decrease in the error r, regardless of which detection characteristic the envelope detector 20 has. Therefore, the error r can be set to the minimum value (ideally, zero) by changing the error r in a direction in which the fluctuation amount w is made smaller.

At a high frequency such as a frequency of a microwave or millimeter-wave, crosstalk tends to occur in the quadrature modulator 17, and carrier leakage may exceed an amplitude of a modulated wave depending on manufacturing variations in integrated circuits.

The first power control for the radio frequency signal and the first carrier leakage correction are thus completed, but an impact of initial large carrier leakage may disturb the first power control for the radio frequency signal, cause the power to be inaccurate, and prevent the radio frequency signal SG having the desired power from being obtained. For this reason, the correction sequence controller 10 provides an instruction for second power control for the radio frequency signal.

The operation of the second power control for the radio frequency signal in the transmitting device 1 of the present embodiment will next be described. In the description of the second power control for the radio frequency signal, the same details as those in the description of the first power control for the radio frequency signal are omitted or simplified, and different details are described.

In the second power control for the radio frequency signal, the offset correction value (xc1,yc1) obtained through the search by the correction value searcher 14 in the first carrier leakage correction is added in the offset corrector 15. Because the operation of the second power control for the radio frequency signal is similar to the operation of the first power control for the radio frequency signal, the detailed description is omitted.

The power adjuster 22 performs the power control to readjust the gain Av for the variable gain amplifiers 171 and 172 such that the output power P from the power measurer 21 becomes the desired power (for example, see the line denoted by the symbol SG in FIG. 10A) and falls within a power range that can be correctly detected by the envelope detector 20. The gain for the variable gain amplifiers 171 and 172 that is adjusted in the second power control for the radio frequency signal is referred to as Av2.

Figure 7A:
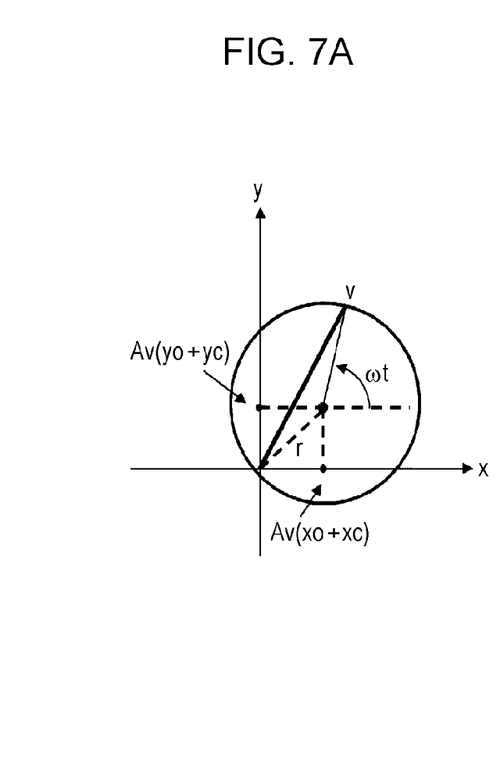
FIG. 7A illustrates the envelope amplitude v before first power control.
Figure 7B:
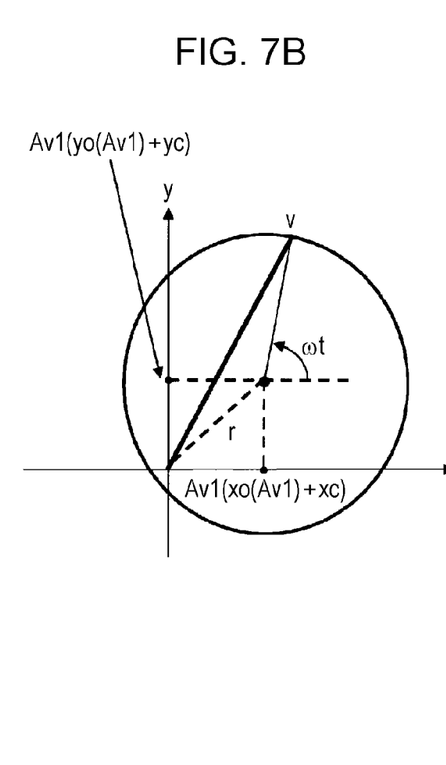
FIG. 7B illustrates the envelope amplitude v after the first power control.
Figure 7C:
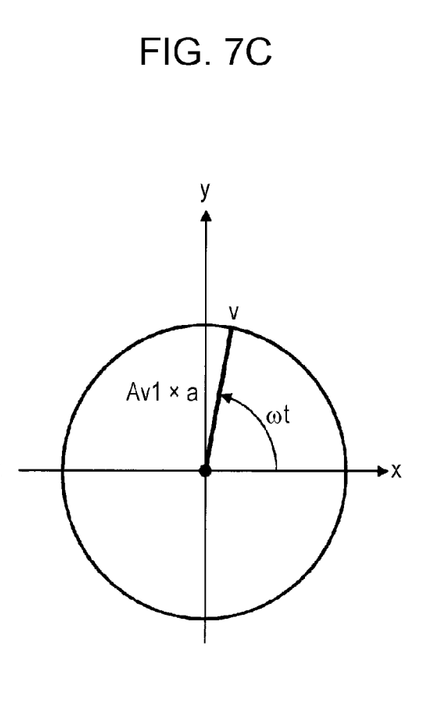
FIG. 7C illustrates the envelope amplitude v after first carrier leakage correction.
Figure 8A:
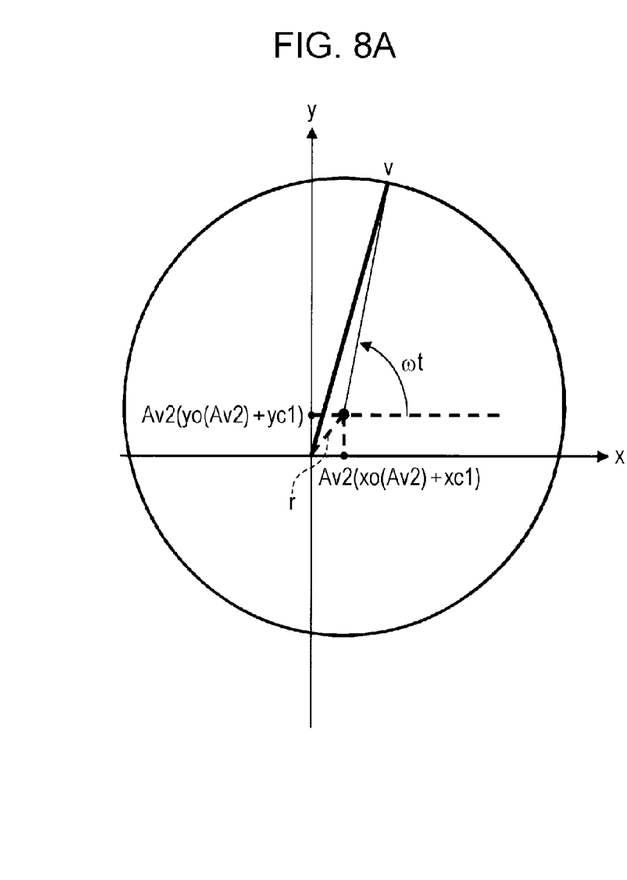
FIG. 8A illustrates the envelope amplitude v after second power control.
Figure 8B:
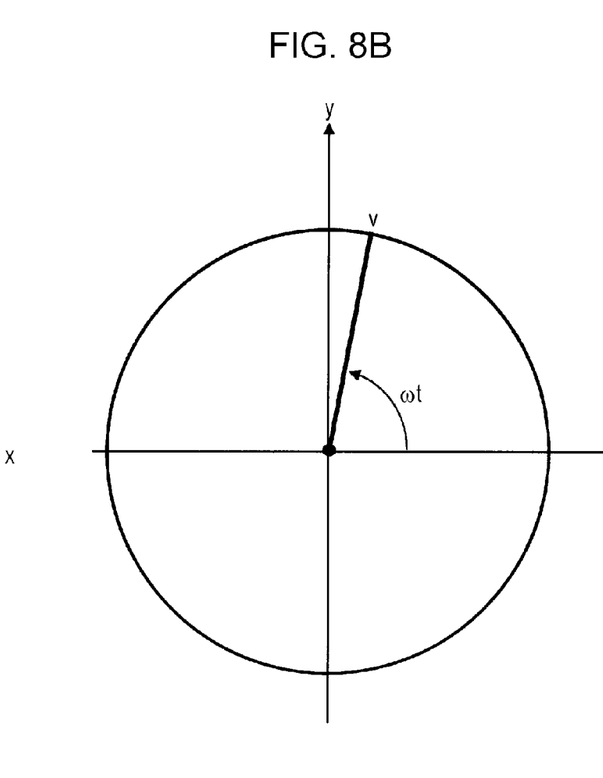
FIG. 8B illustrates the envelope amplitude v after second carrier leakage correction.

FIG. 7A illustrates the envelope amplitude v before the first power control. FIG. 7B illustrates the envelope amplitude v after the first power control. FIG. 7C illustrates the envelope amplitude v after the first carrier leakage correction. FIG. 8A illustrates the envelope amplitude v after the second power control. FIG. 8B illustrates the envelope amplitude v after second carrier leakage correction.

When the gain Av for the variable gain amplifiers 171 and 172 is changed from Av1 to Av2, the values of xo and yo indicating carrier leakage are also changed from (xo(Av1), yo(Av1)) to (xo(Av2), yo(Av2)). The offset correction value (xc1,yc1) obtained through the first adjustment is insufficient for suppression of carrier leakage, and carrier leakage occurs again.

However, because the offset correction value (xc1,yc1) obtained through the search by the correction value searcher 14 in the first carrier leakage correction is added in the offset corrector 15, (xo(Av2)+xc1,yo(Av2)+yc1) indicating carrier leakage after the second power control for the radio frequency signal is smaller than (xo(Av1)+xc,yo(Av1)+yc) indicating the initial carrier leakage.

For example, after the second power control for the radio frequency signal as illustrated in FIG. 8A, the envelope amplitude v indicating a distance from the origin O is larger than that after the first power control for the radio frequency signal as illustrated in FIG. 7B, and it is therefore found that the power is more closer to the desired power.

Thus, in the second power control for the radio frequency signal, the transmitting device 1 can decrease the $r^2$ terms in the output power P expressed by the formula (8), that is, xo and yo indicating carrier leakage, reduce a probability that the power control is disturbed and power is inaccurate, and perform the power control with high accuracy.

The operation of the second carrier leakage correction in the transmitting device 1 of the present embodiment will next be described. In the description of the second carrier leakage correction, the same details as those in the description of the first carrier leakage correction are omitted or simplified, and different details are described.

In the second carrier leakage correction, the correction sequence controller 10 instructs the power adjuster 22 to correct (xo(Av2)−xo(Av1),yo(Av2)−yo(Av1)) indicating a carrier leakage difference that occurs due to a change of the gain Av for the variable gain amplifiers 171 and 172 from Av1 to Av2. Because the operation of the second carrier leakage correction is similar to the operation of the first carrier leakage correction, the detailed description is omitted.

(xo(Av2)−xo(Av1),yo(Av2)−yo(Av1)) indicating the carrier leakage difference to be corrected in the second carrier leakage correction is smaller than (xo(Av1),yo(Av1)) indicating the carrier leakage to be corrected in the first carrier leakage correction.

Therefore, in the second carrier leakage correction, a signal with an envelope detected by the envelope detector 20 may pass through one or two or more of the direct current blocker 23, the variable gain amplifier 24, and the band-pass filter 25 and may be input to the amplitude measurer 26. Not only in the second carrier leakage correction, but also in the first carrier leakage correction, a signal with an envelope detected by the envelope detector 20 may pass through one or two or more of the direct current blocker 23, the variable gain amplifier 24, and the band-pass filter 25 and may be input to the amplitude measurer 26.

Thus, the amplitude measurer 26 can measure the fluctuation amount w of the envelope amplitude v detected by the envelope detector 20 with high accuracy. When a signal with the envelope detected by the envelope detector 20 is input to the variable gain amplifier 24, the variable gain amplifier 24 sets, in the second carrier leakage correction, a gain larger than that in the first carrier leakage correction so that the fluctuation amount w of the envelope amplitude v can be easily detected in response to, for example, an instruction from the correction sequence controller 10.

For example, after the second carrier leakage correction as illustrated in FIG. 8B, the envelope amplitude v indicating a distance from the origin O is larger than that after the first carrier leakage correction as illustrated in FIG. 7C, and it is therefore found that the value more closer to the desired power is obtained, and further that the carrier leakage is appropriately corrected (calibrated) even when the gain for the variable gain amplifiers 171 and 172 is changed from Av1 to Av2.

Figure 9:
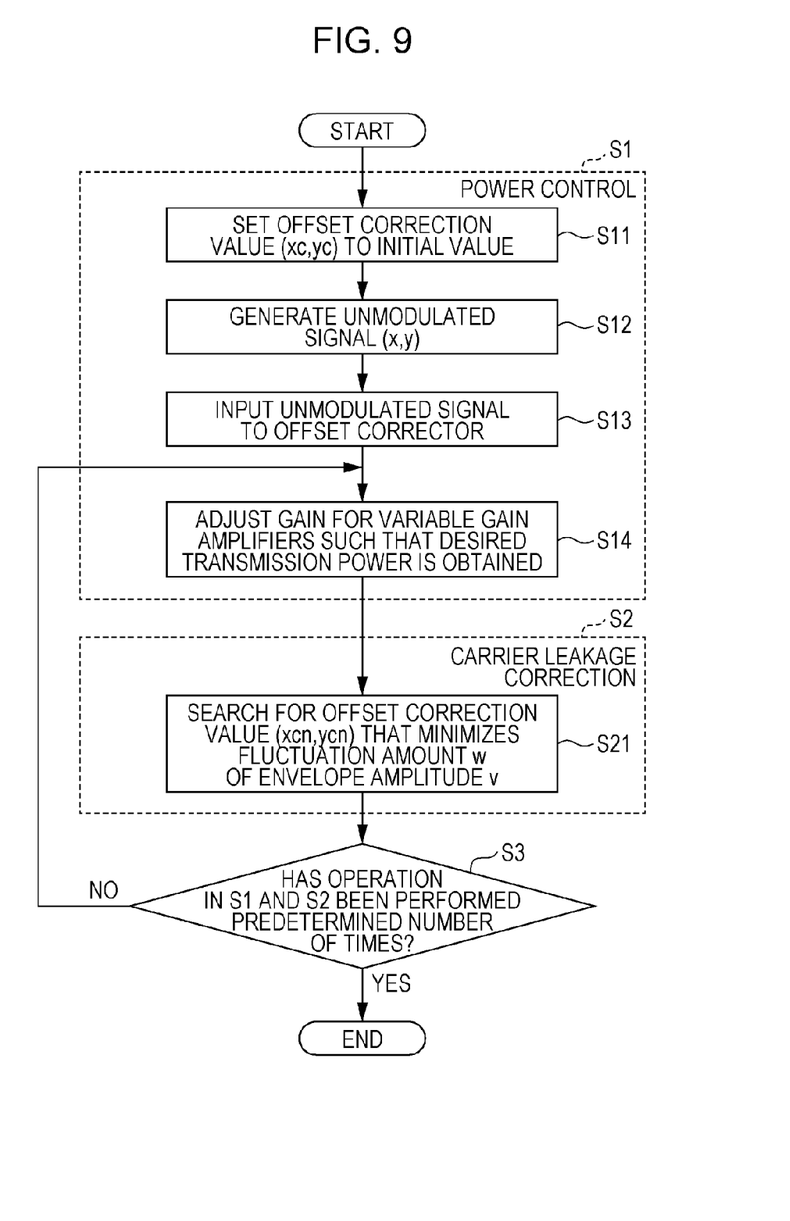
FIG. 9 is a flowchart illustrating an example of an operating procedure for the transmitting device of the present embodiment.

An operating procedure for the power control for the radio frequency signal and the carrier leakage correction in the transmitting device 1 of the present embodiment will next be described with reference to FIG. 9. FIG. 9 is a flowchart illustrating an example of the operating procedure for the transmitting device 1 of the present embodiment. The flowchart illustrated in FIG. 9 indicates that the transmitting device 1 performs the power control in step S1 and the carrier leakage correction in step S2 a predetermined number of times.

In FIG. 9, the correction sequence controller 10 outputs, to the correction value searcher 14, a control signal for outputting an initial value of an offset correction value (xc,yc) (S11). The correction sequence controller 10 outputs, to the continuous wave signal generation unit 12, a control signal for generating a continuous wave signal with a predetermined amplitude a (for example, a regular value (a=1) used for regular data transmission) (S12). The correction sequence controller 10 outputs, to the equivalent low-pass signal selector 13, a control signal for selecting the continuous wave signal generated by the continuous wave signal generation unit 12.

In response to the control signal generated by the correction sequence controller 10, the continuous wave signal generation unit 12 generates the continuous wave signal having the amplitude a, and outputs the signal to the equivalent low-pass signal selector 13. In response to the control signal generated by the correction sequence controller 10, the equivalent low-pass signal selector 13 selects the continuous wave signal generated by the continuous wave signal generation unit 12, and outputs the signal to the offset corrector 15 (S13).

The correction sequence controller 10 outputs, to the power adjuster 22, a control signal for adjusting a gain used to amplify the continuous wave signal such that desired power (see the line denoted by the symbol SG in FIG. 10A) is obtained. In response to the control signal generated by the correction sequence controller 10, the power adjuster 22 adjusts the gain Av for the variable gain amplifiers 171 and 172 such that the output power P from the power measurer 21 falls within a power range that can be correctly detected by the envelope detector 20 (see FIG. 2) (S14).

After step S14, the correction sequence controller 10 outputs, to the correction value searcher 14, a control signal for performing processing for searching for an offset correction value (xcn,ycn) that provides a minimum value of the fluctuation amount w of the envelope amplitude v and outputting the offset correction value (xcn,ycn) obtained through the search processing (S21).

After step S21, in response to the control signal generated by the correction sequence controller 10, the correction value searcher 14 uses an output from the amplitude measurer 26 (the fluctuation amount w of the envelope amplitude v) and searches for the offset correction value (xcn,ycn) that provides the minimum value of the fluctuation amount w. Because the details of the methods for searching for the offset correction value (xcn,ycn) in the correction value searcher 14 have been described above, the description is omitted.

When the power control in step S1 and the carrier leakage correction in step S2 have been performed a predetermined number of times (S3: YES), the operation of the transmitting device 1 illustrated in FIG. 9 is completed. On the other hand, when the power control in step S1 and the carrier leakage correction in step S2 have not been performed the predetermined number of times (S3: NO), the operation of the transmitting device 1 returns to step S14, and is repeated until the power control in step S1 and the carrier leakage correction in step S2 are performed the predetermined number of times n (n is an integer of 1 or larger).

Thus, before modulating and transmitting transmission data, the transmitting device 1 of the present embodiment uses a continuous wave signal having an amplitude of a regular value (for example, a=1) and adjusts a gain for the variable gain amplifiers 171 and 172 in the quadrature modulator 17 such that the power of the signal with an envelope of a radio frequency signal generated based on the continuous wave signal becomes desired power.

Moreover, the transmitting device 1 searches for an offset correction value (xcn,ycn) that provides a minimum value of the fluctuation amount w of the envelope amplitude v of the radio frequency signal generated based on the continuous wave signal, and further performs power control for the radio frequency signal and carrier leakage correction a predetermined number of times (for example, twice).

The transmitting device 1 can thereby suppress carrier leakage that occurs in the quadrature modulator 17, and further control inaccurate power of the radio frequency signal that occurs due to an impact of the carrier leakage to the desired power.

Moreover, when modulating and transmitting the transmission data after the carrier leakage correction, the transmitting device 1 uses the offset correction value (xcn,ycn) obtained through the search in the carrier leakage correction to add the offset correction value (xcn,ycn) to the modulated signal of the transmission data. Accordingly, the transmitting device 1 can obtain the desired power as the power of the radio frequency signal and generate the radio frequency signal in which carrier leakage is suppressed even when quadrature modulation of the modulated signal of the transmission data is performed, thereby suppressing degradation in the detection accuracy for a received signal in the receiving device.

In addition, even when carrier leakage that occurs in the quadrature modulator 17 becomes large in response to, for example, manufacturing variations or an operating temperature range, the transmitting device 1 of the present embodiment can sufficiently suppress the carrier leakage, thereby transmitting the modulated signal with high fluctuation accuracy and suppressing degradation in the communication quality.

Although various embodiments have been described above with reference to the drawings, it is obvious that the present disclosure is not limited to such examples. It is apparent that those skilled in the art would be able to conceive various examples of changes or modifications within the scope indicated in the claims, and it should be appreciated that these examples are also included in the technical scope of the present disclosure.

The present disclosure has been described above with an example in which the transmitting device 1 is configured with, for example, hardware resources. However, part of the transmitting device 1 may be configured with software that collaborates with the hardware resources.

The units (components) of the transmitting device 1 of the present embodiment described above are typically implemented as large scale integration (LSI) chips, which are integrated circuits. An each individual component may be contained on a single LSI chip, or some or all components may be contained on a single LSI chip. The integrated circuit technique is LSI here, but may be referred to as integrated circuit (IC), system LSI, super LSI, or ultra LSI depending on a difference in a degree of integration.

The integrated circuit technique is not limited to LSI, and the components may be implemented using dedicated circuits or general-purpose processors. After the manufacture of LSI chips, field programmable gate arrays (FPGAs), or reconfigurable processors with which the connection and setting of circuit cells inside the LSI chips are reconfigurable may be used.

In addition, if an integrated circuit technology that replaces LSI emerges with the advance of the semiconductor technology or with the advent of another derivative technology, the units of the transmitting device 1 may be integrated using that technology. There is a possibility of, for example, applying the biotechnology.

The present disclosure is useful as a calibration device and a calibration method that can suppress carrier leakage that occurs in quadrature modulation of a radio frequency signal and obtain a radio frequency signal having desired power.

What is claimed is:

1. A calibration device comprising:
    a continuous wave signal generator that generates a continuous wave signal having a predetermined amplitude;
    a quadrature modulator that amplifies the continuous wave signal using a variable gain and performs quadrature modulation of the amplified continuous wave signal to generate a radio frequency signal;
    an envelope detector that detects an envelope of the radio frequency signal;
    a gain adjuster that adjusts the variable gain, based on power of the detected envelope;
    a correction value searcher that searches for a correction value that provides a minimum value of a fluctuation amount of an amplitude of the envelope; and
    a corrector that adds the correction value obtained through the search by the correction value searcher to the continuous wave signal and outputs the continuous wave signal after the addition to the quadrature modulator.

2. The calibration device according to claim 1, wherein
    the quadrature modulator amplifies the continuous wave signal using the variable gain adjusted by the gain adjuster, and
    the corrector adds, to the continuous wave signal, the correction value that is obtained through the search corresponding to the envelope of the radio frequency signal subjected to quadrature modulation using the variable gain adjusted by the gain adjuster.

3. The calibration device according to claim 1, further comprising:
    a power measurer that measures power of the envelope and outputs the measured power to the gain adjuster; and
    an amplitude measurer that measures a fluctuation amount of the amplitude of the envelope and outputs the measured fluctuation amount to the correction value searcher.

4. The calibration device according to claim 1, further comprising:
    a direct current blocker that removes a direct current component of the amplitude of the envelope.

5. The calibration device according to claim 1, further comprising:
    an amplifier that amplifies the fluctuation amount of the amplitude of the envelope.

6. The calibration device according to claim 1, further comprising:
    a signal extractor that extracts a frequency component of the fluctuation amount of the amplitude of the envelope.

7. A calibration method in the calibration device comprising:
    generating a continuous wave signal having a predetermined amplitude;
    amplifying the continuous wave signal using a variable gain;
    performing quadrature modulation of the amplified continuous wave signal to generate a radio frequency signal;
    detecting an envelope of the radio frequency signal;
    adjusting the variable gain, based on power of the detected envelope;
    searching for a correction value that provides a minimum value of a fluctuation amount of an amplitude of the envelope; and
    adding the correction value obtained through the search to the continuous wave signal and outputting the continuous wave signal after the addition to the quadrature modulator.

* * * * *